United States Patent
Tripathi et al.

(10) Patent No.: US 7,613,132 B2
(45) Date of Patent: Nov. 3, 2009

(54) METHOD AND SYSTEM FOR CONTROLLING VIRTUAL MACHINE BANDWIDTH

(75) Inventors: Sunay Tripathi, San Jose, CA (US); Tim P. Marsland, Half Moon Bay, CA (US); Nicolas G. Droux, Rio Rancho, NM (US)

(73) Assignee: Sun Microsystems, Inc., Santa Clara, CA (US)

( * ) Notice: Subject to any disclaimer, the term of this patent is extended or adjusted under 35 U.S.C. 154(b) by 475 days.

(21) Appl. No.: 11/480,000

(22) Filed: Jun. 30, 2006

(65) Prior Publication Data
US 2008/0002704 A1    Jan. 3, 2008

(51) Int. Cl.
*H04L 12/28* (2006.01)
(52) U.S. Cl. ...................... 370/255; 370/401
(58) Field of Classification Search ............... 370/252, 370/254, 255, 389, 392, 400, 401, 412, 419, 370/463
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,721,355 B1 * | 4/2004 | McClennon et al. | 375/222 |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,990,106 B2 * | 1/2006 | Bhatia | 370/395.53 |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,272,831 B2 * | 9/2007 | Cota-Robles et al. | 718/1 |
| 7,313,142 B2 | 12/2007 | Matsuo et al. | |
| 7,356,818 B2 * | 4/2008 | Carollo et al. | 718/102 |
| 7,440,415 B2 * | 10/2008 | Wild et al. | 370/254 |
| 2002/0052972 A1 | 5/2002 | Yim | |
| 2003/0037154 A1 | 2/2003 | Poggio et al. | |
| 2004/0267866 A1 * | 12/2004 | Carollo et al. | 709/200 |
| 2005/0111455 A1 * | 5/2005 | Nozue et al. | 370/392 |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner*—Hong Cho
(74) *Attorney, Agent, or Firm*—Osha • Laing LLP (57) ABSTRACT

A method of controlling bandwidth including receiving and classifying a packet, sending the packet to a hardware receive ring based on a classification of the packet, and sending, in accordance with an operating mode, the packet to a software receive ring, sending the packet from the software receive ring to a virtual network interface card, where the virtual network interface card is associated with a virtual machine, where the operating mode is adjusted to control the bandwidth consumed by the virtual machine.

18 Claims, 4 Drawing Sheets

U.S. PATENT DOCUMENTS

| | | |
|---|---|---|
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0045089 A1* | 3/2006 | Bacher et al. ............... 370/392 |
| 2006/0070066 A1 | 3/2006 | Grobman |
| 2006/0174324 A1 | 8/2006 | Zur et al. |
| 2006/0209718 A1* | 9/2006 | Kinsey et al. ............... 370/254 |
| 2006/0233168 A1* | 10/2006 | Lewites et al. ............... 370/389 |
| 2006/0294517 A1* | 12/2006 | Zimmer et al. ................. 718/1 |
| 2007/0171904 A1* | 7/2007 | Tchigevsky ................. 370/389 |

OTHER PUBLICATIONS

Dovrolis, C., Thayer, B, and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

METHOD AND SYSTEM FOR CONTROLLING VIRTUAL MACHINE BANDWIDTH

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with issued as U.S. Pat. No. 7,471,689; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,964; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

SUMMARY

In general, in one aspect, the invention relates to a method of controlling bandwidth including receiving and classifying a packet, sending the packet to a hardware receive ring based on a classification of the packet, and sending, in accordance with an operating mode, the packet to a software receive ring, sending the packet from the software receive ring to a virtual network interface card, where the virtual network interface card is associated with a virtual machine, where the operating mode is adjusted to control the bandwidth consumed by the virtual machine.

In general, in one aspect, the invention relates to a system for controlling bandwidth including a network interface card including a plurality of hardware receive rings, a classifier configured to classify a packet and sending the packet to one of the plurality of hardware rings based on a classification, and a host, operatively connected to the network interface card, including a virtual network interface card associated with a virtual machine, a software receive ring associated with the virtual network interface card and at least one of the plurality of hardware receive rings, where the packet is sent from the hardware receive ring to the software receive ring based on an operating mode of the software receive ring, where the operating mode is adjusted to control the bandwidth consumed by the virtual machine.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for controlling the bandwidth consumed by a virtual machine. More specifically, embodiments of the invention relate to a method and system for controlling bandwidth using software receive rings.

Figure 1:
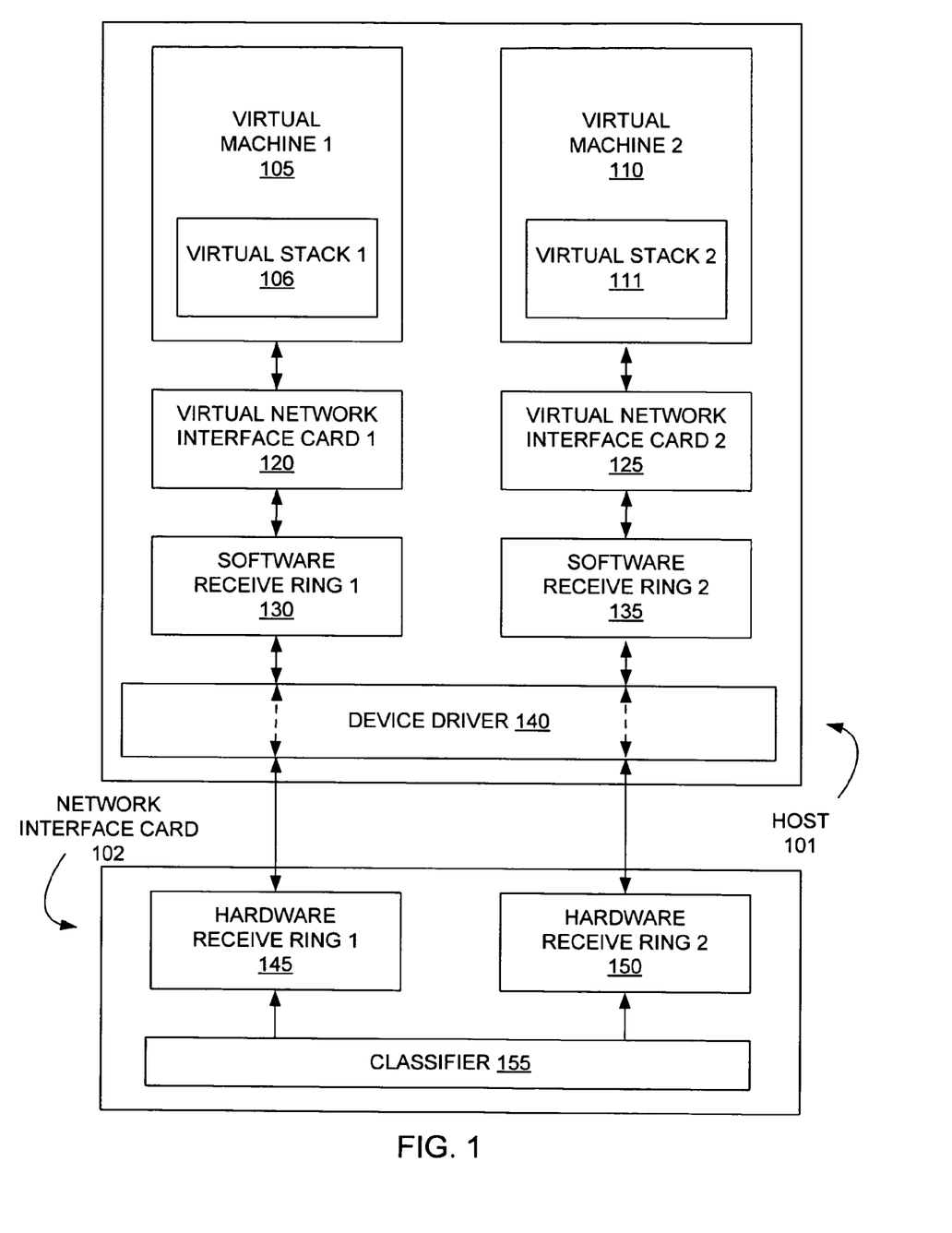
FIG. 1 shows a computer system in accordance with one or more embodiments of the invention.

FIG. 1 shows a system in accordance with one embodiment of the invention. As shown in FIG. 1, the system includes a host (101) operatively connected to a NIC (102). The NIC (102) provides an interface between the host (101) and a network (not shown) (e.g., a local area network, a wide area network, a wireless network, etc.). More specifically, the NIC (102) includes a network interface (NI) (i.e., the hardware on the NIC used to interface with the network) (not shown). For example, the NI may correspond to an RJ-45 connector, a wireless antenna, etc. The packets received by the NI are then sent to other components on the NIC (102) for processing. In one embodiment of the invention, the NIC (102) includes a classifier (155) and one or more hardware receive rings (145, 150). In one embodiment of the invention, the hardware receive rings (145, 150) correspond to portions of memory within the NIC (102) used to temporarily store the received packets. Further, in one embodiment of the invention, a ring element of the receive rings (145, 150) may point to host memory. In one embodiment of the invention, the classifier (155) is configured to analyze the incoming network traffic, typically in the form of packets, received from the network (not shown).

In one embodiment of the invention, analyzing individual packets includes determining to which of the hardware receive rings (145, 150) each packet is sent. In one embodiment of the invention, analyzing the packets by the classifier (155) includes analyzing one or more fields in each of the packets to determine to which of the hardware receive rings (145, 150) the packets are sent. As an alternative, the classifier (155) may use the contents of one or more fields in each packet as an index into a data structure that includes information necessary to determine to which hardware receive ring (145, 150) that packet is sent. The classifier (155) may be implemented entirely in hardware (i.e., the classifier (155) may be a separate microprocessor embedded on the NIC (102)). Alternatively, the classifier (155) may be implemented in software stored in memory (e.g., firmware, etc.) on the NIC and executed by a microprocessor on the NIC (102).

In one embodiment of the invention, the host (101) may include the following components: a device driver (140), one or more software receive rings (130, 135), one or more virtual NICs (120, 125), and one or more virtual machines (105, 110) containing one or more virtual stacks (106, 111). In one embodiment of the invention, the device driver (140) provides an interface between the hardware receive rings (145, 150) and the host (101). More specifically, the device driver (140) exposes the hardware receive rings (145, 150) to the host (101).

In one embodiment of the invention, each of the software receive rings (130, 135) is associated with one or more hardware receive rings (145, 150). In one embodiment of the invention, there is a one-to-one mapping of hardware receive rings (145, 150) to software receive rings (130, 135). In one embodiment of the invention, a packet may flow from a hardware receive ring (145, 150) to a virtual NIC (120, 125) through a software receive ring (130, 135). In other words, the software receive ring (130, 135) corresponds to a buffer interposed between a hardware receive ring (145, 150) and a virtual NIC (120, 125). Alternatively, the software receive ring (130, 135) corresponds to a FIFO queue interposed between a hardware receive ring (145, 150) and a virtual NIC (120, 125).

In one embodiment of the invention, a software receive ring (130, 135) may be capable of determining the bandwidth consumed by a virtual machine (105, 110) by analyzing the number and/or contents of packets flowing from a hardware receive ring (145, 150) to the software receive ring (130, 135) (and, thus, to the virtual machine associated with the software receive ring). In one embodiment of the invention, each software receive ring (130, 135) is capable of adjusting the operating mode of the one or more hardware receive rings (145, 150) based on bandwidth consumption (discussed below). Further, in one embodiment of the invention, each software receive ring (130, 135) is configured to regulate the flow of packets from the NIC (102) to the virtual NICs (120, 125) based on its operating mode (discussed below). In one embodiment of the invention, each software receive ring (130, 135) is implemented in the Media Access Control (MAC) layer (not shown) of the host (101).

In one or more embodiments of the invention, each of the virtual NICs (120, 125) is associated with a software receive ring (130, 135). The virtual NICs (120, 125) provide an abstraction layer between the NIC (102) and the various packet destinations (not shown) executing on the virtual machines (105, 110) of the host (101). More specifically, each virtual NIC (120, 125) operates like a NIC (102). For example, in one embodiment of the invention, each virtual NIC (120, 125) is associated with one or more Internet Protocol (IP) addresses, one or more ports, and configured to handle one or more protocol types. Thus, while the host (101) may be operatively connected to a single NIC (102), packet destinations (not shown) executing on the virtual machines (105, 110) of the host (101) operate as if the host (101) is bound to multiple NICs. In one or more embodiments of the invention, each of the virtual NICs (120, 125) is implemented in the MAC layer of the host (101).

In one embodiment of the invention, each of the virtual NICs (120, 125) is operatively connected to a virtual machine (105, 110), where each virtual machine (105, 110) includes one or more virtual stacks (106, 111). In one embodiment of the invention, each virtual stack (106, 111) includes network layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, each virtual stack (106, 111) is configured to send and/or receive packets from one or more associated packet destinations (not shown) on the virtual machine (105, 110). Further, each virtual stack (106, 111) is configured to send and/or receive packets from an associated virtual NIC (120, 125). Further still, each virtual stack (106, 111) may also include functionality, as needed, to perform additional processing on the incoming and outgoing packets. This additional processing may include, but is not limited to, cryptographic processing, firewall routing, etc. In one embodiment of the invention, each of the virtual machines (105, 110) is located outside of the MAC layer (not shown) of the host (101).

In one embodiment of the invention, each virtual machine (105, 110) shares host resources (e.g., one or more central processing units (CPU), memory, etc.) (not shown) with other virtual machines (105, 110) on the host (101). As discussed above, a virtual machine (105, 110) on a host (101) may include one or more packet destinations (e.g., containers and/or services) (not shown). In one embodiment of the invention, the packet destination(s) (e.g., containers and/or services) corresponds to any process or group of processes executing on the virtual machine of the host that sends and receives network traffic. Examples of packet destinations include, but are not limited to containers, services (e.g., web server), etc.

Figure 2:
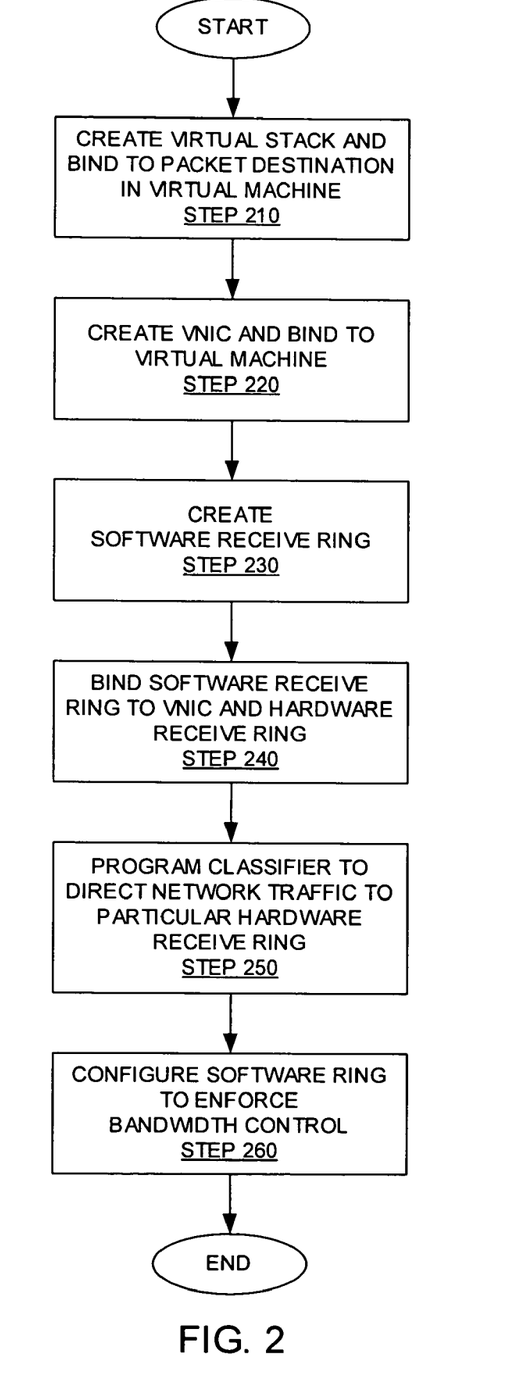
FIGS. 2 and 3 show flow charts in accordance with one or more embodiments of the invention.

FIG. 2 shows a flowchart in accordance with one embodiment of the invention. Initially, a virtual stack is created and bound to a packet destination executing on a virtual machine (STEP 210). Those skilled in the art will appreciate that the packet destination may be bound to the virtual stack anytime after the virtual stack has been created. In STEP 220, a virtual NIC is created and bound to the virtual machine. At this stage, a software receive ring is created (STEP 230) and bound to both the virtual machine and a hardware receive ring (STEP 240). The classifier is subsequently programmed such that network traffic for the virtual machine is directed to the hardware ring bounded to the software ring created in STEP 230 (STEP 250). The software receive ring is then programmed to enforce bandwidth control (STEP 260).

In one embodiment of the invention, programming the software ring to enforce bandwidth control (STEP 260) includes specifying a packet arrival rate threshold. In one embodiment of the invention, the packet arrival rate threshold specifies the maximum number of packets that may flow to the software ring over a given time interval (e.g., the maximum number of packets that may flow to the virtual NIC per second). Alternatively, the packet arrival rate threshold may specify the number of bytes of data that may flow to the software receive ring over a specific time interval.

Those skilled in the art will appreciate that the steps shown in FIG. 2 may be repeated as required to create any number of virtual stacks. Once the virtual network stack(s) has been created, as described above, the host may proceed to receive packets from the network. Those skilled in the art will also appreciate that the number of virtual stacks created using the steps shown in FIG. 2 may vary based on the available system resources (e.g., number of CPUs, type of NIC, etc.).

Figure 3:
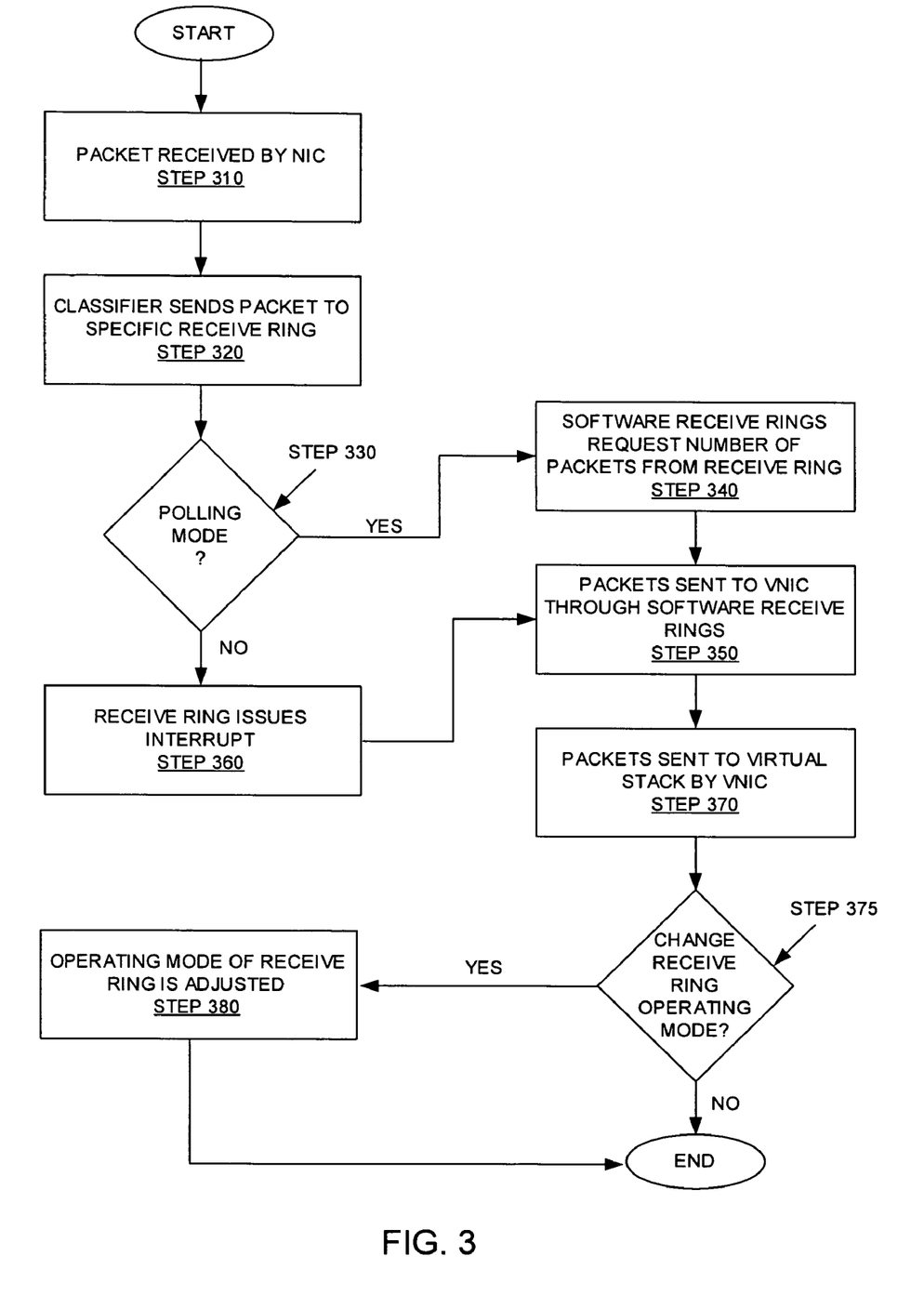

FIG. 3 shows a flowchart in accordance with one embodiment of the invention. Initially, a packet is received by the NIC (STEP 310). The classifier analyses the packet and determines to which of the hardware receive rings the packed should be sent. The packet is subsequently sent to the appropriate hardware receive ring (STEP 320). At this stage, the process determines the operating mode of the hardware receive ring (STEP 330).

In one embodiment of the invention, a hardware receive ring may operate in polling mode. If the hardware receive ring is operating in polling mode, then the packet remains in the hardware receive ring until the software receive ring requests one or more packets from the hardware receive ring (STEP 340). In one embodiment of the invention, the software receive ring may request all packets in the hardware receive ring, or may request any number of packets in the hardware receive ring. Subsequently, the packet(s) is sent to the software receive ring (STEP 350). In one embodiment of the invention, the software ring may not request any packets if the packet arrival rate exceeds the packet arrival rate threshold. In one embodiment of the invention, the software ring may poll the hardware receive ring to keep the packet arrival rate at or below the packet arrival rate threshold.

In one embodiment of the invention, the hardware receive ring may operate in interrupt mode. If the hardware receive ring is operating in interrupt mode, then the hardware receive ring may issue an interrupt when it receives the packet (STEP 360). The packet (and any additional packets at the time the interrupt is issued) on the hardware receive ring is then send to software receive ring (STEP 350).

In STEP 370, the packet(s) in the software receive ring is sent to virtual stack through the associated virtual NIC. In STEP 375, it is determined whether the operation mode of the receive ring needs to be changed. In one embodiment of the invention, if the packet arrival rate at the software receive ring exceeds the packet arrival rate threshold, the hardware receive rings may be placed in polling mode (STEP 380). In one embodiment of the invention, if the packet arrival rate at the software receive ring is below the packet arrival rate threshold, the hardware receive ring may be placed in interrupt mode (or no action may be taken with respect to changing the operating mode) (STEP 380).

Figure 4:
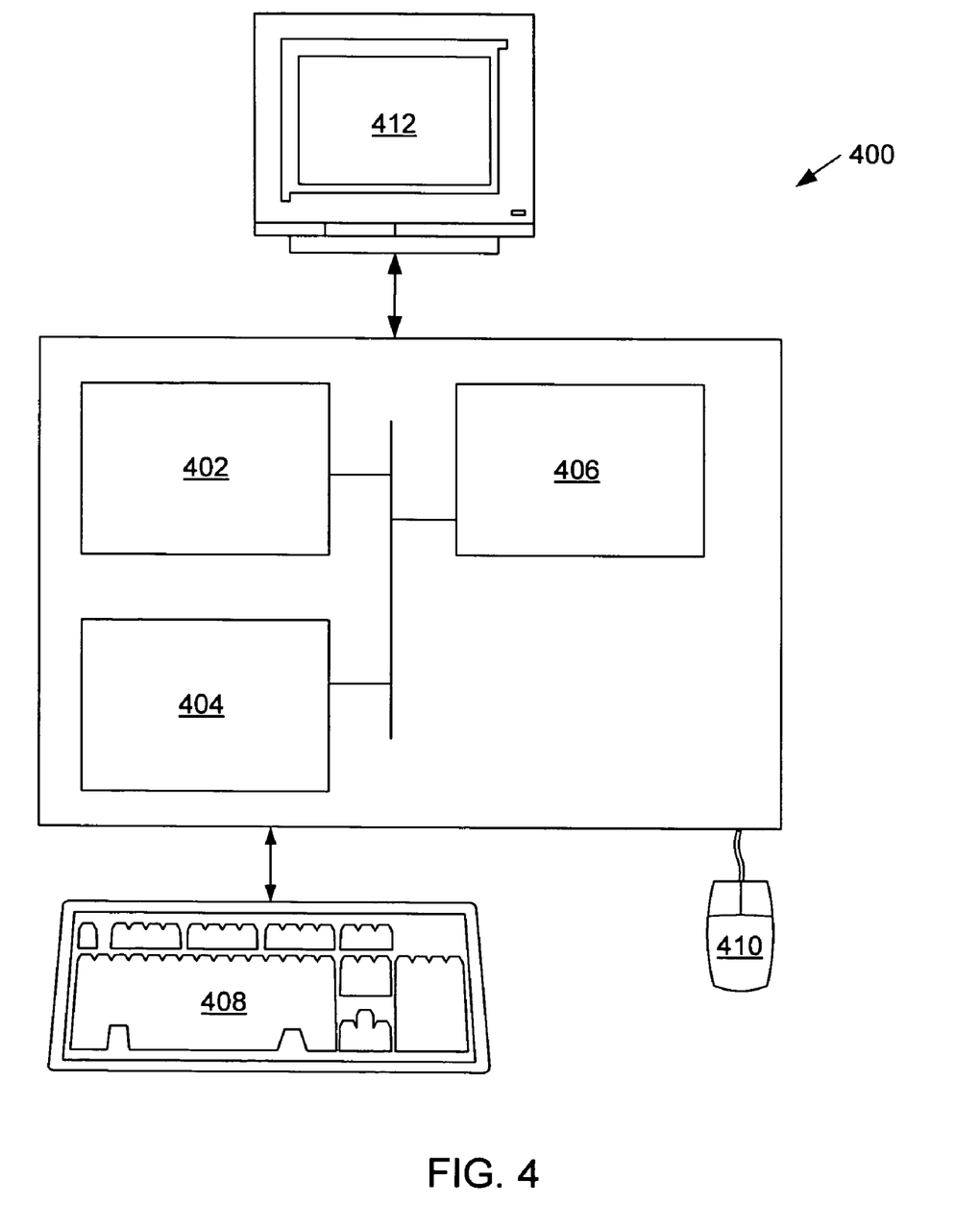
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., VNIC, software receive ring, virtual stack, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of controlling bandwidth comprising:
   receiving and classifying a packet;
   sending the packet to a hardware receive ring based on a classification of the packet;
   sending, in accordance with an operating mode, the packet to a software receive ring; and
   sending the packet from the software receive ring to a virtual network interface card,
   wherein the virtual network interface card is associated with a virtual machine,
   wherein the operating mode is adjusted to control the bandwidth consumed by the virtual machine,
   wherein the operating mode comprises at least one selected from a group consisting of an interrupt mode and a polling mode.

2. The method of claim 1, wherein the software receive ring is configured to change the operating mode.

3. The method of claim 2, wherein the operating mode is changed based on a predefined packet arrival rate threshold at the software receive ring.

4. The method of claim 1, wherein an interrupt is generated prior to sending the packet to the virtual network interface card when the software receive ring is operating in the interrupt mode.

5. The method of claim 1, wherein the packet is sent to the virtual network interface card following a polling request when the software receive ring is operating in the polling mode.

6. The method of claim 1, wherein the classification is based on a header of the packet.

7. The method of claim 1, wherein a mapping of the hardware receive ring to the software receive ring is one-to-one.

8. The method of claim 1, wherein the software receive ring is located in a Media Access Control (MAC) layer of a host and wherein the virtual machine is located on the host.

9. A system for controlling bandwidth comprising:
   a network interface card comprising:
      a plurality of hardware receive rings;
      a classifier configured to classify a packet and sending the packet to one of the plurality of hardware rings based on a classification; and
   a host, operatively connected to the network interface card, comprising:
      a virtual network interface card associated with a virtual machine;
      a software receive ring associated with the virtual network interface card and at least one of the plurality of hardware receive rings,
   wherein the packet is sent from the hardware receive ring to the software receive ring based on an operating mode of the software receive ring,
   wherein the operating mode is adjusted to control the bandwidth consumed by the virtual machine,
   wherein the operating mode comprises at least one selected from a group consisting of an interrupt mode and a polling mode.

10. The system of claim 9, wherein the virtual machine comprises:
    a virtual stack bound to a packet destination, wherein the packet is intended for the packet destination.

11. The system of claim 9, wherein the operating mode is changed by the software receive ring.

12. The system of claim 11, wherein the operating mode is changed based on a packet arrival rate at the software receive ring.

13. The system of claim 9, wherein an interrupt is issued prior to sending the packet to the virtual network interface card when the software receive ring is operating in the interrupt mode.

14. The system of claim 9, wherein the packet is sent to the virtual network interface card following a polling request when the software receive ring is operating in the polling mode.

15. The system of claim 9, wherein a mapping of the hardware receive ring to the software receive ring is one-to-one.

16. The system of claim 9, wherein the classifier is configured to classify based on a header associated with the packet.

17. The system of claim 9, wherein the software receive ring corresponds to a buffer interposed between the hardware receive ring and the virtual network interface card.

18. The system of claim 9, wherein software receive ring is located in a Media Access Control (MAC) layer of the host.

* * * * *

UNITED STATES PATENT AND TRADEMARK OFFICE
CERTIFICATE OF CORRECTION

PATENT NO. : 7,613,132 B2  
APPLICATION NO. : 11/480000  
DATED : November 3, 2009  
INVENTOR(S) : Tripathi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this

Nineteenth Day of October, 2010

David J. Kappos  
*Director of the United States Patent and Trademark Office*